P. S. WHITING.
DISK WHEEL.
APPLICATION FILED NOV. 5, 1920.

1,412,301.

Patented Apr. 11, 1922.
2 SHEETS—SHEET 1.

Inventor
Phineas S. Whiting,
By
Attorneys

P. S. WHITING.
DISK WHEEL.
APPLICATION FILED NOV. 5, 1920.
1,412,301.
Patented Apr. 11, 1922.
2 SHEETS—SHEET 2.
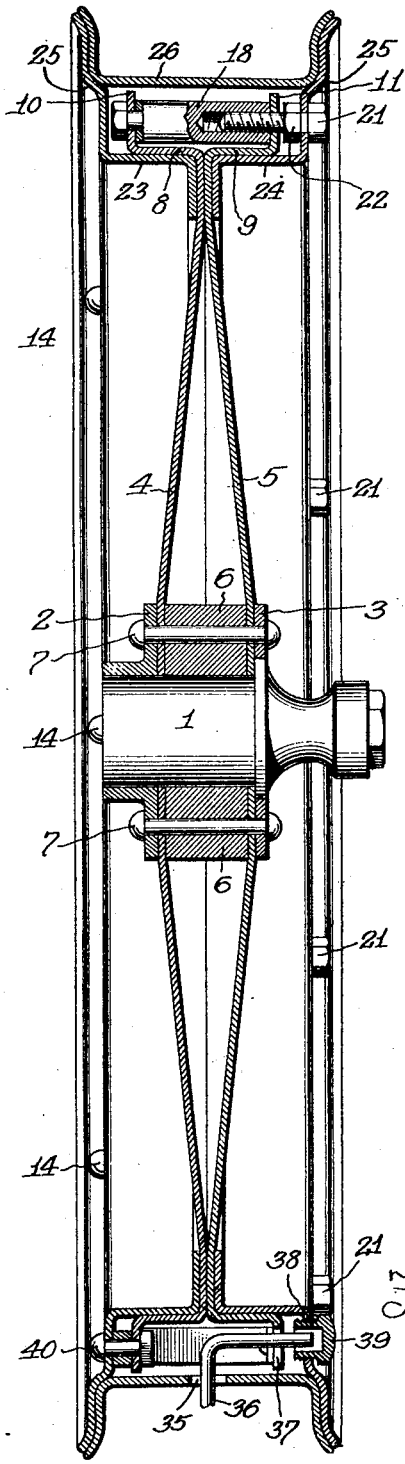
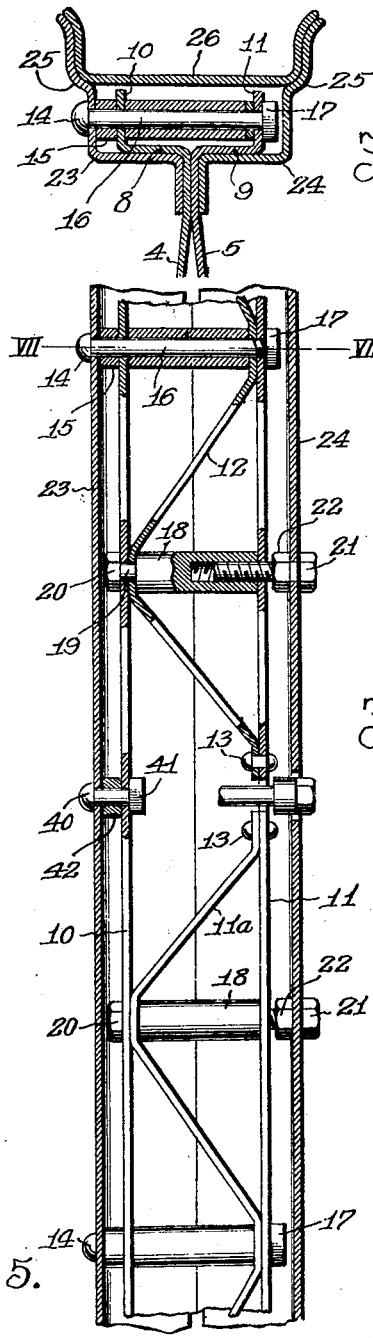
Inventor
Phineas S. Whiting.
By
Attorneys

UNITED STATES PATENT OFFICE.

PHINEAS S. WHITING, OF ROYAL OAK, MICHIGAN.

DISK WHEEL.

1,412,301.  Specification of Letters Patent.  Patented Apr. 11, 1922.

Application filed November 5, 1920. Serial No. 421,866.

*To all whom it may concern:*

Be it known that I, PHINEAS S. WHITING, a citizen of the United States of America, residing at Royal Oak, in the county of Oakland and State of Michigan, have invented certain new and useful Improvements in Disk Wheels, of which the following is a specification, reference being had therein to the accompanying drawings.

My invention aims to provide a metallic vehicle wheel which may be considered in that class of wheels commonly known as "disk" wheels, wherein the body of the wheel is composed of pressed steel disks forming an annular web between the hub and rim of the wheel, and my invention may be further classified by including a demountable outer tire rim by which tires may be expeditiously interchanged.

My invention, in its broadest aspects, involves a peripheral construction for a disk wheel wherein a load sustained by the wheel is suspended during the operation of the wheel with the point of suspension constantly shifting so that the stresses and strains will be so distributed relative to any particular place in the wheel construction, that no part of the wheel construction is liable to be fractured or injured during the operation of the wheel.

My invention further aims to provide a vehicle wheel body having its peripherial edges reinforced by circumferentially disposed truss members articulating the disks of the wheel body so that the peripheral edges of the disk body will afford a rigid and durable inner rim on which may be placed side members adapted for supporting a felly or outer rim, the arrangement between the inner rim and the side members being such that a load sustained by the inner rim may be safely carried by the side members without subjecting any particular portion of the inner rim to greater wear than other portions of said inner rim.

The above results have already been attained by a wheel which has been put into practice, and the construction of the wheel has been illustrated in the drawings but it is to be understood that the precise construction and arrangement of parts shown may be varied without departing from the scope of the appended claims.

Reference will now be had to the drawings, wherein—

Fig. 5 is an enlarged cross sectional view of the wheel taken on the line V—V of Fig. 1;

Fig. 6 is a horizontal sectional view following the periphery of the disk wheel and showing a portion thereof, particularly the inner rim, and Fig. 7 is a cross sectional view taken on the line VII—VII of Fig. 6.

Figure 1:
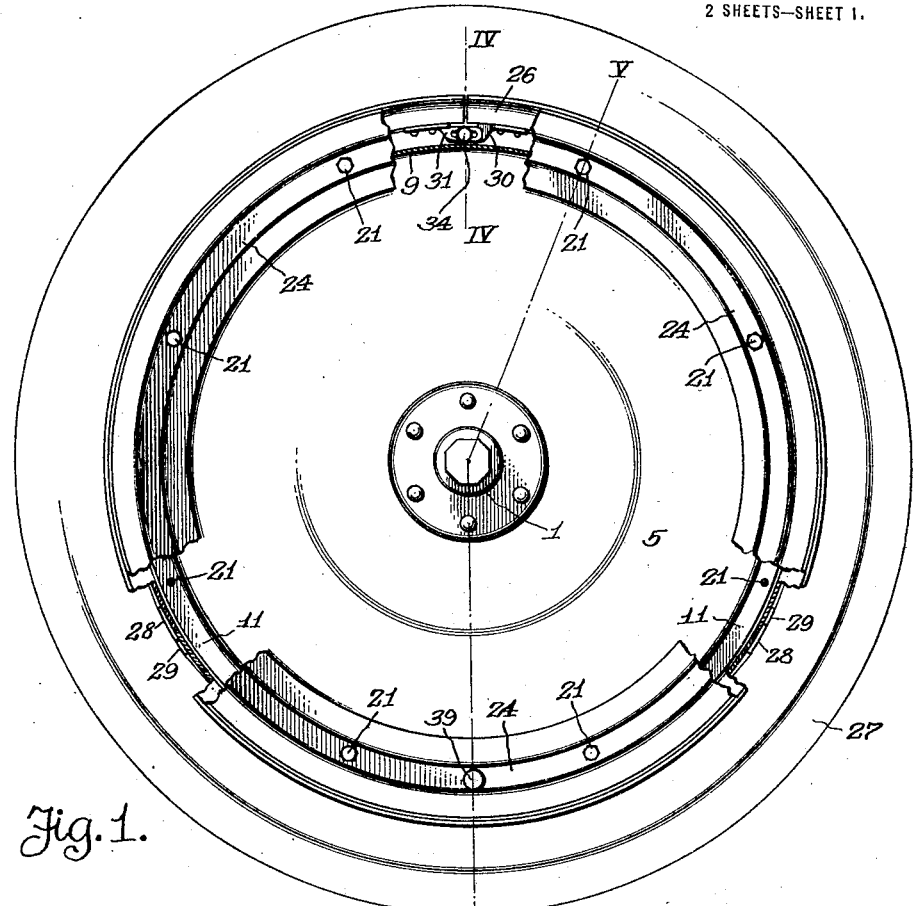
Figure 1 is a side elevation of the disk wheel, partly broken away and partly in section.

In the drawings, the reference numeral 1 denotes a conventional form of hub provided with inner and outer members 2 and 3 for holding a disk body on the hub, said disk body being composed of disks 4 and 5 with a central filler member 6 therebetween and the inner and outer members 2 and 3, disks 4 and 5, and filler member 6 are connected together by rivets 7 or other fastening means. One of the inner or outer members 2 and 3 may be integral with the hub 1 and the same may be true of the filler member 6, however, various types of hubs may be supported centrally of the disks 4 and 5.

The disks 4 and 5 have the peripheral edges thereof shaped to provide annular shoulders 8 and 9 respectively and peripheral parallel flanges 10 and 11 respectively, the shoulders and flanges cooperating in providing an annular inner channel rim, as best shown in Figs. 6 and 7.

Mounted in the inner channel rim is a circumferential reinforcing member, which for the convenience of manufacture is preferably made in two sections 11a and 12 having the ends thereof riveted or otherwise connected to one of the flanges 10 or 11, as at 13. Each reinforcing section is in the form of a strap bent to provide angular portions extending from the flange 10 to the flange 11 so that the reinforcing sections may be connected to the flanges at intervals throughout the circumference of the inner end.

Alternating fasteners include bolts 14, spacing sleeves 15 and 16 and nuts 17. The other fasteners include spacing socket sleeves 18, bolts 19, nuts 20 and screw bolts 21 provided with retaining or backing-off nuts 22. Before describing the specific arrangement of these fasteners it is necessary to consider other elements entering into the invention.

Mounted on the annular shoulder 8 of the inner disk 4 is an annular side member 23 and detachably held on the annular shoulder 9 of the outer disk 5 is a detachable side member 24. These side members cooperate in forming an outer channel in which the inner channel rim is housed, and the peripheral edges of the side members 23 and 24 are shaped to provide annular shoulders 25 affording seats for a sectional rim 26, which when on the seats or shoulders 25 cooperates with the side members 23 and 24 in providing an annular enclosure for the inner rim.

Again considering the fasteners of the inner rim, the bolts 14 engage the side member 23 with the spacer sleeves 15 between said side member and the flange 10, while the spacer sleeves 16 are between the flange 10 and the reinforcing sections 11ª and 12. The nuts 17 of the bolts 14 bear against the flange 11 and it is now apparent that the side member 23 is anchored, at intervals, relative to the inner channel rim.

The other fasteners have the spacing socket sleeves 18 between the reinforcing sections 11ª and 12 and the flange 11 with the bolts 19 and 20 connecting the flange 10 to the reinforcing sections independent of the side member 23. The screw bolts 21 are held in engagement with the detachable side member 24 by the retaining or backing-off nuts 22, and said screw bolts extend through the flange 11 into the socket sleeves 18. This constructive arrangement of the fasteners permits of the side member 23 being held by the inner rim while the detachable side member 24 may be backed out of the inner rim by simply rotating the screw bolts 21, otherwise the detachable side member 24 is firmly held by the inner rim against lateral displacement.

Figures 2, 3, 4:
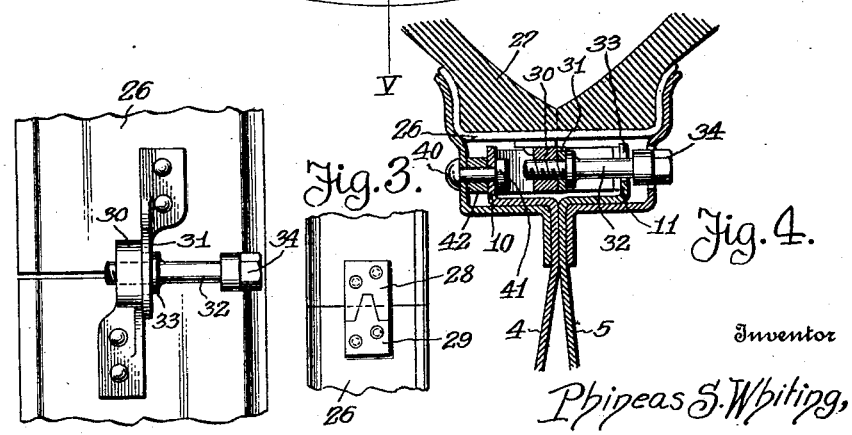
Fig. 2 is a plan of a portion of the outer rim, showing the inner wall thereof provided with connecting means for sections of said rim.
Fig. 3 is a plan of a connection between other sections of the outer rim.
Fig. 4 is an enlarged cross sectional view of a portion of the wheel taken on the line IV—IV of Fig. 1.

In order that a conventional form of tire 27 may be mounted on the outer rim 26, the outer rim has been made of a plurality of sections having abutting and articulated ends, and by reference to Fig. 2 it will be observed that certain ends of the outer rim sections have groove plates 28 to receive tongue plates 29 of other sections, said groove and tongue plates being riveted or otherwise connected to the inner walls of the rim sections. The manner of connecting the other ends of the rim sections is shown in Fig. 2, where one of the rim sections has a nut 30 fixed thereto and the adjacent rim section provided with a slotted lug 31. The slotted lug 31 is adapted to be clamped against the nut 30 by a screw bolt 32 adjustable in the nut 30 and having a collar 33 which abuts the slotted lug 31 and fixes said lug relative to the nut. The screw bolt 32 extends through a slot 33 in the flange 11 out of an opening 34 in the detachable side member 24.

When a pneumatic tire is used on the outer rim 26 some provision must be made for inflating the tire and by reference to Fig. 5 it will be noted that the outer rim 26 has an opening 35 providing clearance for an angular tube 36, said tube extending into the inner rim and through a slot 37 of the flange 11 to an opening 38 in the detachable side member 24. The opening 28 has its walls screwthreaded to receive a hollow plug or cap 39 employed to protect the end of the tube 36. This tube may be constructed similar to an ordinary filler tube so that air, injected into the tire, cannot escape through said tube.

In making the outer rim in sections it is possible to assemble the sections against the inner circumferential walls of a deflated tire and then distend or expand the tire so that it will be firmly clamped against the rim. This may be accomplished even while the tire is inflated, but in practice, the sections of the outer rim may be assembled before the tire is inflated and then after inflation the tire and its outer rim will be in condition to be mounted on the wheel body. This is accomplished by placing the outer rim on the wheel body with said rim surrounding the inner rim and seated on the shoulder 25 of the side member 23. In so placing the outer rim, it is necessary that the air tube 36 and the screw bolts 32 be placed in the slots 37 and 33 respectively, of the inner rim, and by reference to Fig. 1, it will be noted that these two devices are diametrically opposed. By separating the ends of the sections 11ª and 12 of the reinforcing member there is clearance for the screw bolts 32 and the tube 36, and since these two devices or elements are not connected to the side member 23, additional bolts 40, nuts 41 and spacer sleeves 42 may be used to connect the side member 23 to the flange 10 opposite the screw bolts 32 and the tube 36.

The detachable side member 24 can then be placed in position to be drawn towards the disk 5 within the annular shoulder 9 thereof, and by progressively and intermittently rotating the screw bolts 21, the detachable side member can be seated against the disk 5 and the outer rim 26, so that the detachable side member may cooperate with the side member 23 in supporting the side edges of the outer rim 26. It is now apparent that the tire supports the side members 23 and 24 and that the wheel body is somewhat suspended from said side members, and this is brought about by having the side members extending into the side of the inner rim and engaging the annular shoulders 8 and 9 thereof. Looking at Fig. 5, it will be noted that any load carried by the hub 1 is distributed to the side members 23 and 24 supported by the outer rim 26 and the tire 27, and should there be any stresses and strains during the operation of the wheel, it will be the upper most portion of the revolving side members which will sustain the load. But since the wheel may be considered as revolving, it is obvious that the load or stresses and strains has a constantly changing point of suspension and consequently no particular part of the side members and the outer rim are at all times subjected directly to a maximum load condition. The side member 23 is only anchored by the bolts 40 and the nuts 41 at intervals, relative to the flange 10 of the disk 4, so that the annular shoulder 8 may actually rest on the side member 23 and prevent any shearing action at the bolts 40, which serve to anchor or hold the side member in place. The demountable or outer rim 26 can then be placed in position, on the annular shoulder 25, and the detachable member 24 attached to the inner rim. Since the side members 23 and 24 are not positively fixed to the inner rim, said inner rim will have constantly changing points of support on the annular shoulders of the disks 4 and 5. This, together with the circumferentially disposed reenforcing member in the inner rim, which prevents spreading of the disks 4 and 5 constitute an important feature of my invention, and it is believed to differ in this respect from disk wheels heretofore used.

What I claim is:—

1. In a disk wheel, an outer tire supported rim, side members on said rim, and a disk wheel body having an inner rim substantially suspended between said side members.

2. A disk wheel as in claim 1, characterized by a circumferential reinforcing member in the rim of said disk wheel body to prevent lateral displacement of disks of the wheel body.

3. In a disk wheel, a disk body having an inner rim providing annular shoulders, side members set in the sides of the inner rim of said disk body on the shoulders of the inner rim, an outer tire rim on said side member, fasteners anchoring one of said side members to the rim of said disk body and fasteners detachably connecting the other side member to the rim of said disk body.

4. A disk wheel as in claim 3, characterized by a reinforcing member in the rim of said disk body preventing separation of the disks of said body.

5. A disk wheel as in claim 3, characterized by the fasteners being alternately disposed and the last mentioned fasteners adapted for drawing the side member into the side of the disk body.

6. A disk wheel comprising a body composed of disks having the peripheral edges thereof shaped to provide annular shoulders and flanges cooperating in forming a channel inner rim, a reinforcing member circumferentially of the inner rim connecting the flanges thereof at intervals throughout the circumference of the inner rim, and side members set in the annular shoulders of said body and adapted for supporting a tire.

7. A wheel comprising a body, an inner rim carried thereby and having spaced circumferential flanges, a circumferential reinforcing member connecting flanges of said inner rim, and side members connected to the flanges of said inner rim adapted to support a tire.

8. A wheel as in claim 7, characterized by fasteners fixedly holding one of said side members and fasteners detachably holding the other of said side members.

9. A disk wheel comprising a disk body having a hub and a rim, separable side members set in the rim of said disk body with the inner edges of said side members against said disk body, and a tire supporting rim on said side members and held thereby so that the load of the disk body may be sustained by said side members at a point above the hub of said disk body.

In testimony whereof I affix my signature in presence of two witnesses.

PHINEAS S. WHITING.

Witnesses:
ANNA M. DORR,
KARL H. BUTLER.